Feb. 28, 1928.  
E. J. KEARBY  
1,660,997  
SELECTIVE CLUTCH CONSTANT MESH GEAR TRANSMISSION  
Filed July 6, 1926    7 Sheets-Sheet 1
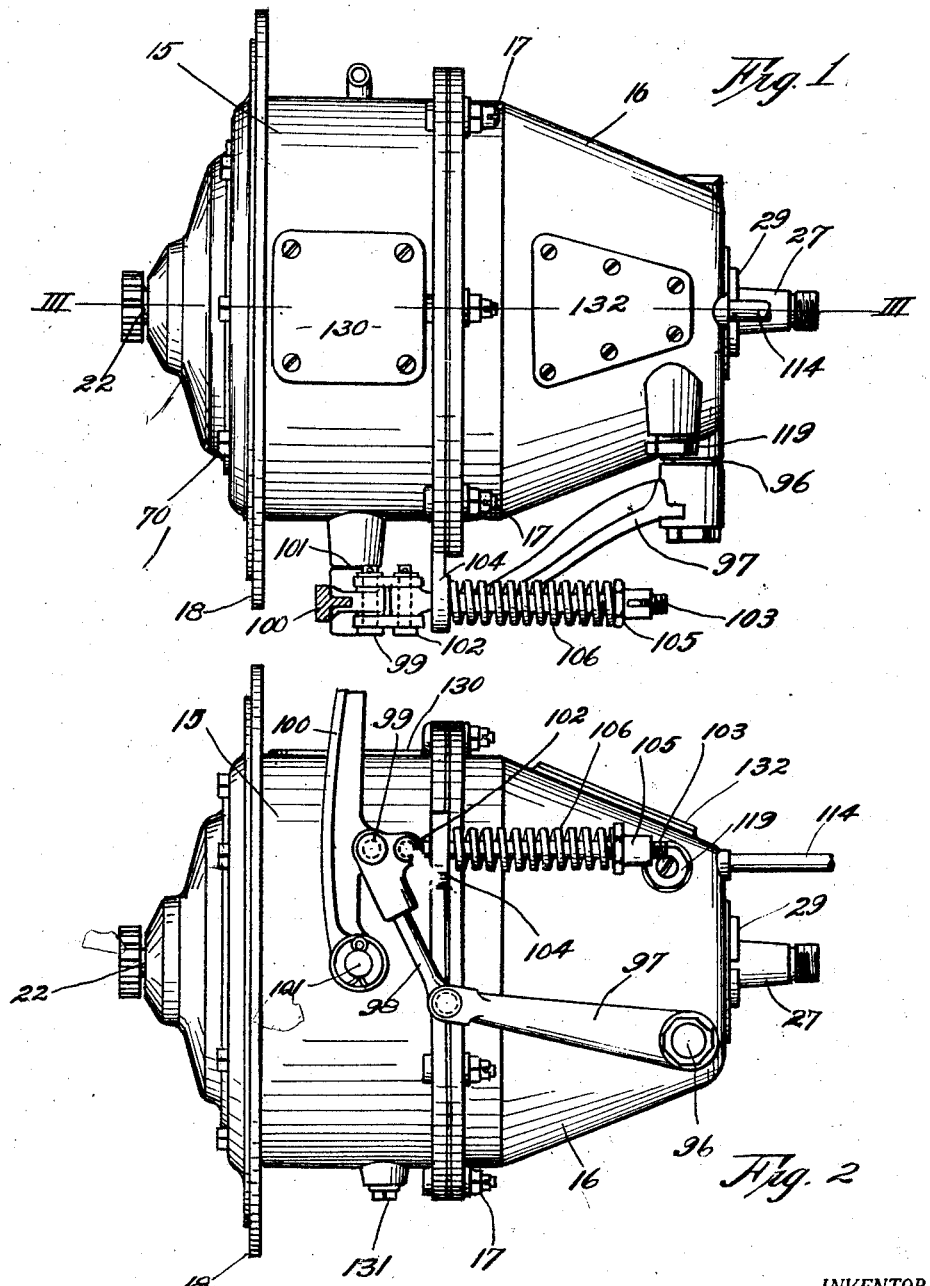

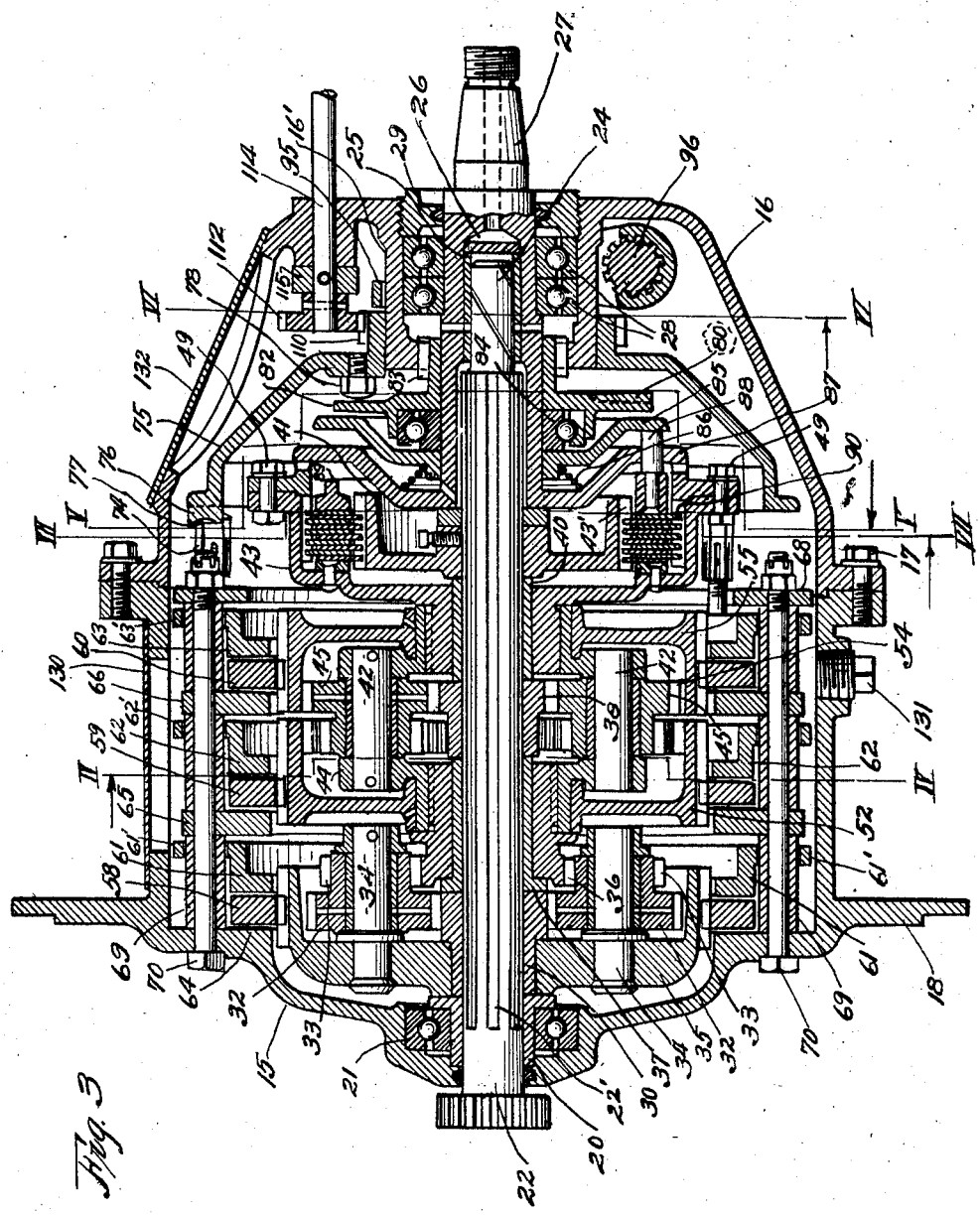

Feb. 28, 1928.
E. J. KEARBY
1,660,997
SELECTIVE CLUTCH CONSTANT MESH GEAR TRANSMISSION
Filed July 6, 1926     7 Sheets-Sheet 3
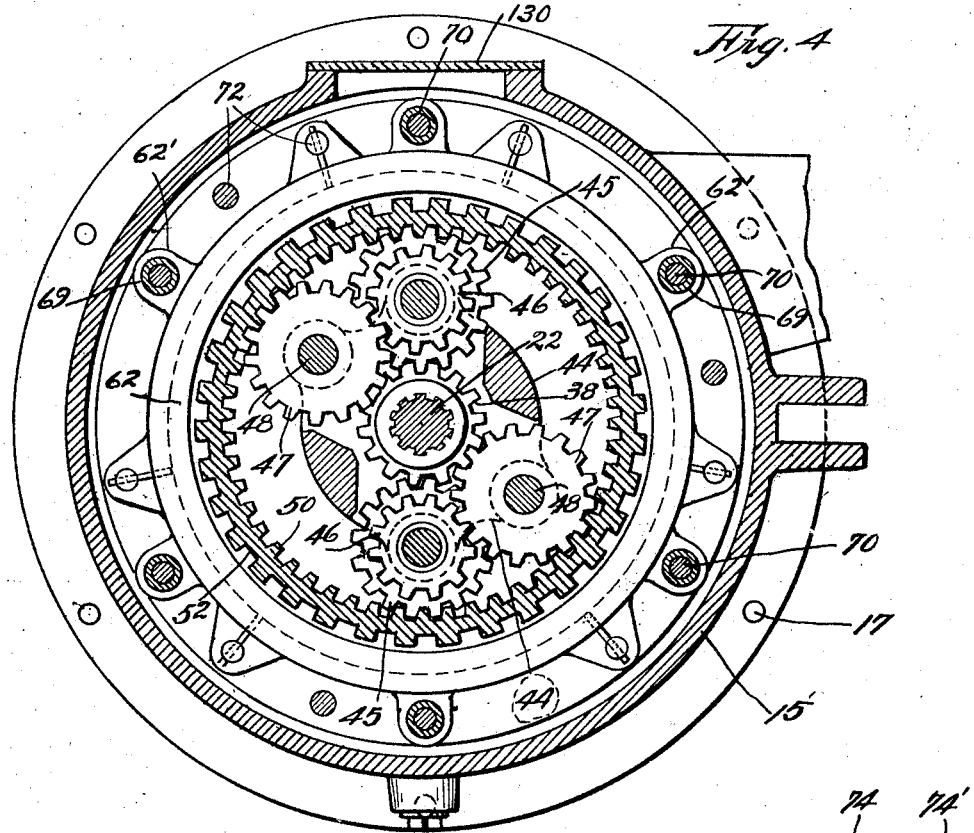
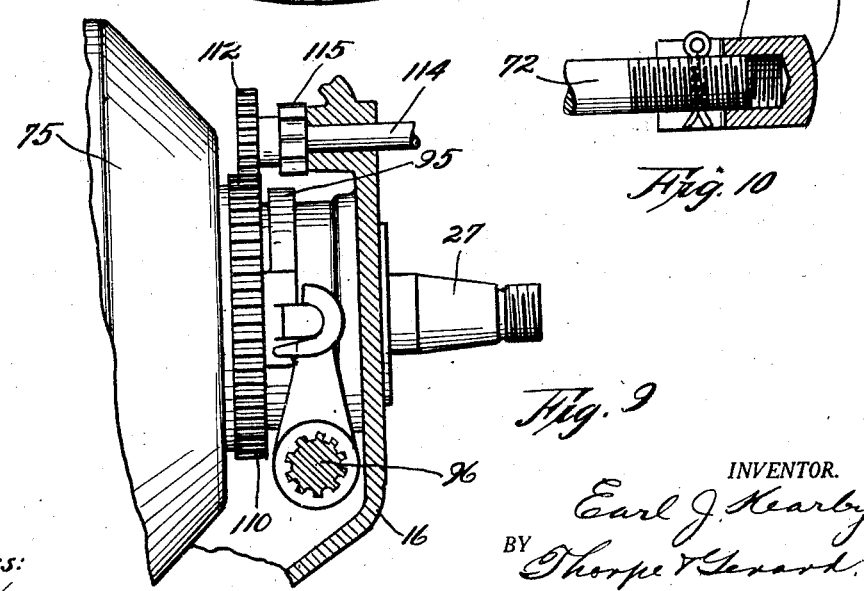
INVENTOR.
Earl J. Kearby.
BY Thorpe & Gerard
ATTORNEYS.

Feb. 28, 1928.
E. J. KEARBY
1,660,997
SELECTIVE CLUTCH CONSTANT MESH GEAR TRANSMISSION
Filed July 6, 1926    7 Sheets-Sheet 4
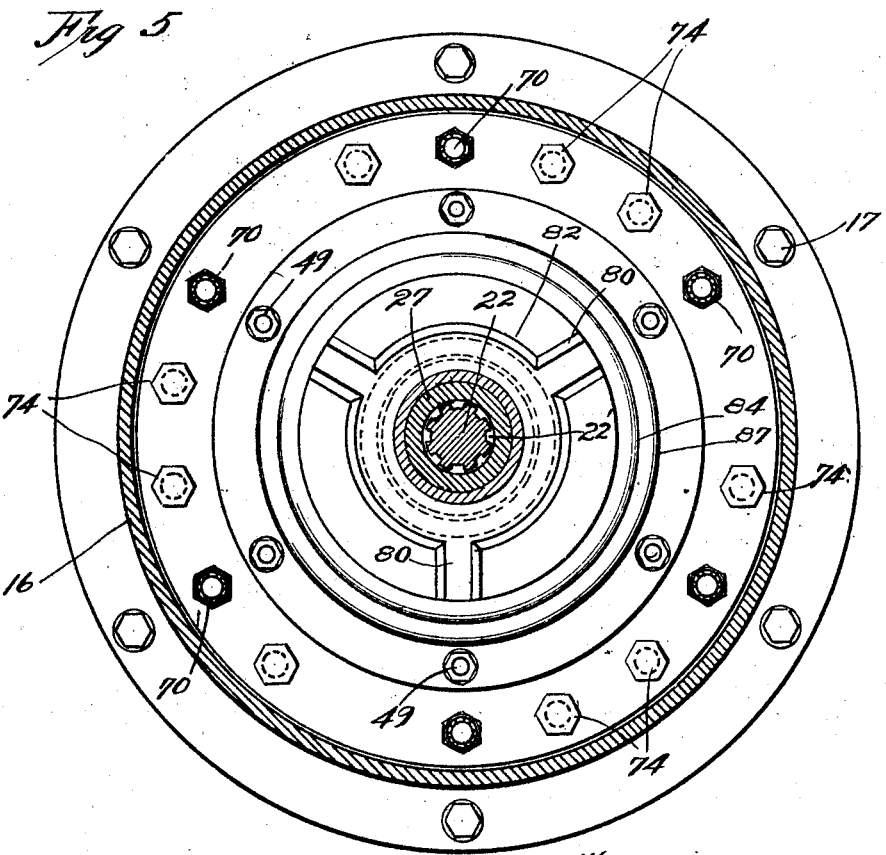
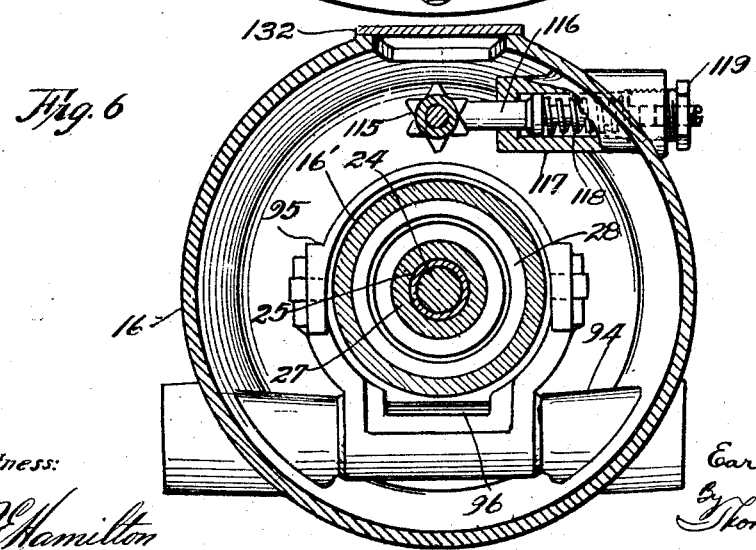

Feb. 28, 1928.
E. J. KEARBY
1,660,997
SELECTIVE CLUTCH CONSTANT MESH GEAR TRANSMISSION
Filed July 6, 1926     7 Sheets-Sheet 5
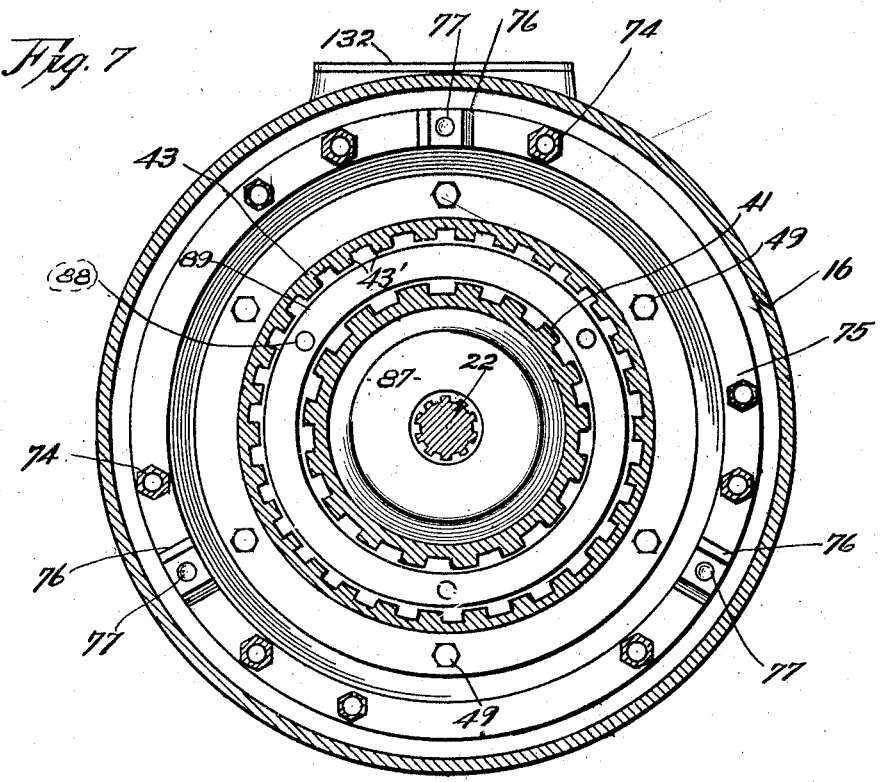
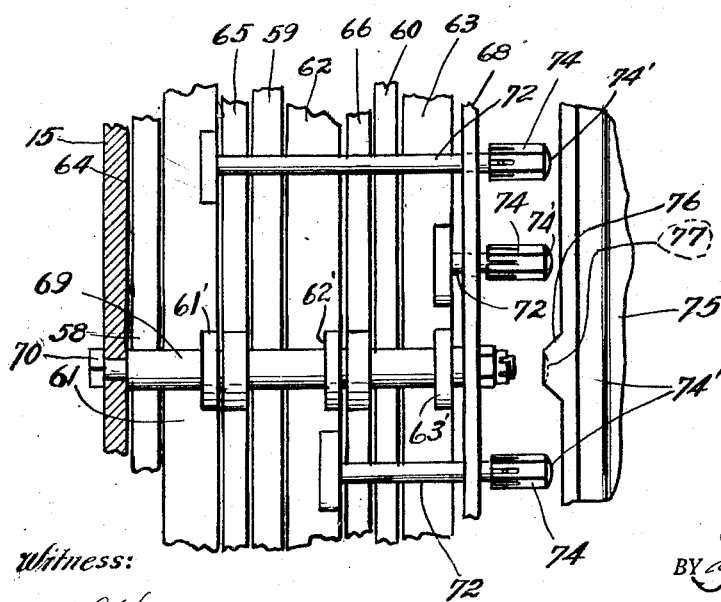
INVENTOR.
Earl J. Kearby
BY Thorpe & Gerard
ATTORNEYS.

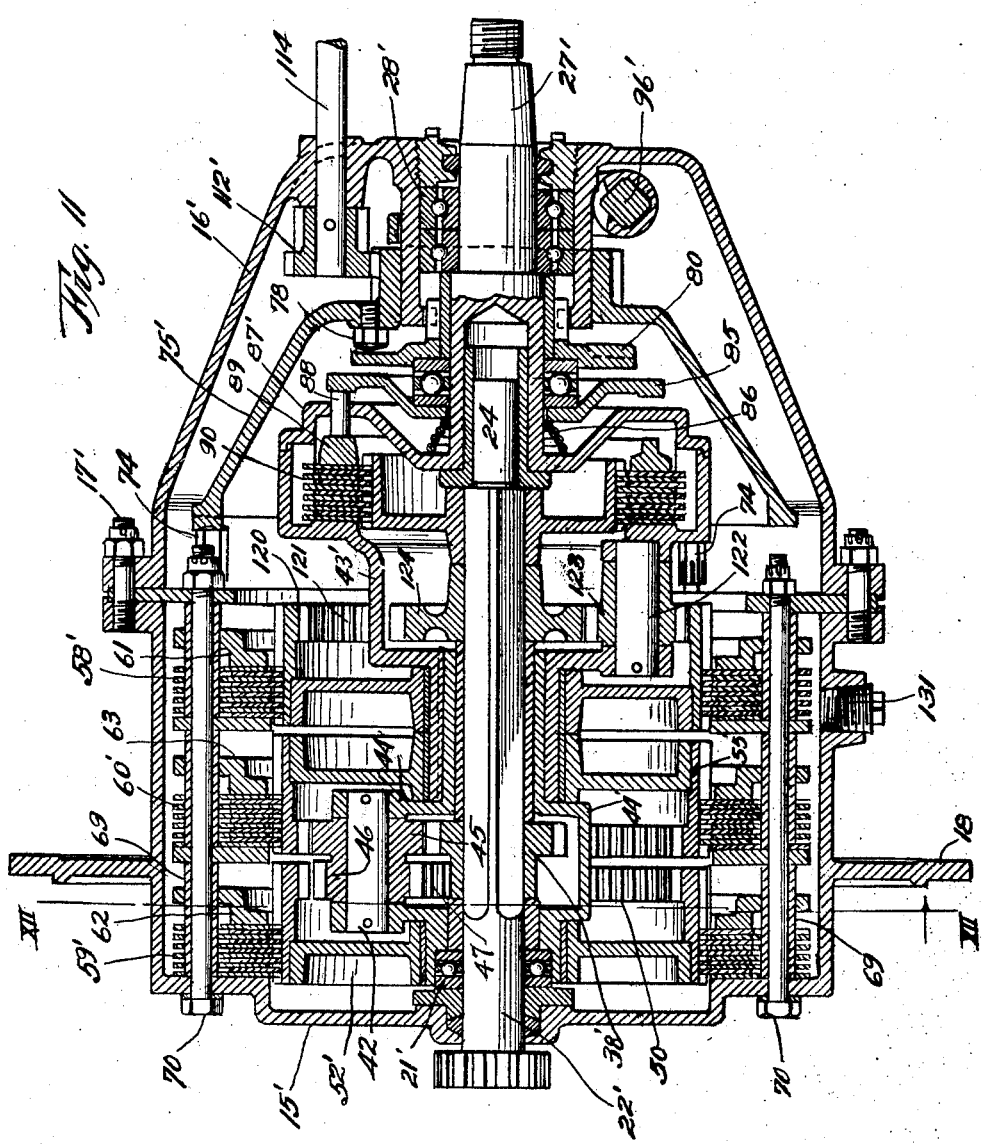

Feb. 28, 1928.
E. J. KEARBY
1,660,997
SELECTIVE CLUTCH CONSTANT MESH GEAR TRANSMISSION
Filed July 6, 1926   7 Sheets-Sheet 7
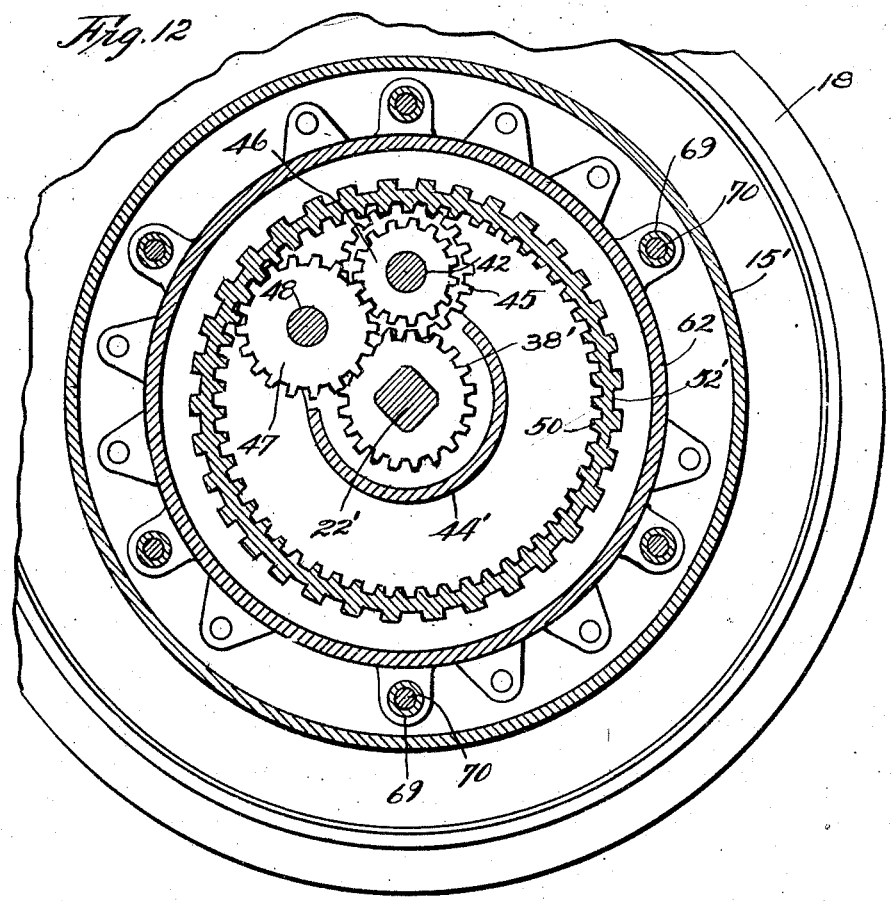
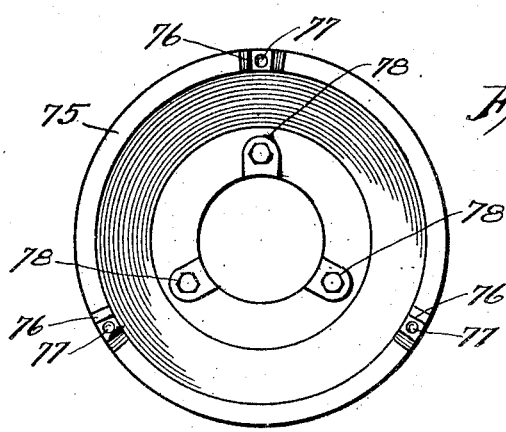
INVENTOR.
Earl J. Kearby
BY Thorpe & Gerard
ATTORNEYS.

Patented Feb. 28, 1928.

1,660,997

UNITED STATES PATENT OFFICE.

EARL J. KEARBY, OF ST. JOSEPH, MISSOURI, ASSIGNOR OF ONE-HALF TO REGINALD H. FOSTER, OF KANSAS CITY, MISSOURI.

SELECTIVE-CLUTCH CONSTANT-MESH GEAR TRANSMISSION.

Application filed July 6, 1926. Serial No. 120,625.

The present invention relates to power transmission mechanism, and aims to provide a novel and improved type of selective clutch transmitting mechanism comprising a combination of selective clutch elements and variable speed and reversing gears, together with a clutch control device whereby the same may be operated for bringing into action any one of the variable speed or reversing gears, according to the will of the operator.

In its preferred form, the improved apparatus comprises change speed and reversing gears which are maintained in constant mesh, in combination with separate clutching means for each of the variable speeds as well as the reverse gearing, and a control for the clutching means whereby the variable speed changes, as well as the reversal of the drive, may be effected.

It is also sought to devise a construction which is not only efficient in its operation, but also of such practical design of construction as to be economical to manufacture and to repair and maintain in proper working order.

With the foregoing general objects in view, the invention will now be described by reference to the accompanying drawings, illustrating certain forms of embodiment of the proposed improvements, after which those features and combinations deemed to be novel will be particularly set forth and claimed.

In the drawings—

Figure 1 is a plan view illustrating a selective clutch transmission mechanism constructed in accordance with the present invention;

Figure 2 is a side elevation of the same;

Figure 3 is a vertical central section, taken on the line III—III of Figure 1; but on an enlarged scale;

Figures 4, 5, 6 and 7 are transverse sections taken on the lines IV—IV, V—V, VI—VI and VII—VII, respectively, of Figure 3;

Figure 8 is a fragmentary plan view, showing one of the sets of selective clutch actuating means;

Figure 9 is an enlarged sectional elevation, showing a portion of the selective clutch control disk, and operating connections therefor;

Figure 10 is an enlarged sectional detail of a portion of one of the clutch actuating rods;

Figure 11 is a vertical central sectional view, similar to Figure 3, but illustrating a modified form of construction;

Figure 12 is a fragmentary transverse section, taken on the line XII—XII of Figure 11; and Figure 13 is a view in elevation of the operative face of the clutch selector disk.

Referring now to the said drawings in detail, these illustrate the improved transmission as comprising two main housing sections, a front section 15 and a rear section 16, formed with meeting flanges secured together by means of screws 17 as clearly illustrated in Figures 1 and 2. The forward section 15 is also formed with the laterally projecting flange 18 for adapting it for attachment to the frame of an automobile, for which the form of construction as illustrated is especially designed, although it is to be understood that the invention is not limited to such use, but is adapted for any industrial purpose for which a transmission mechanism of this character may be used. The housing section 15 is provided centrally with a bearing structure comprising a bearing sleeve 20 surrounded by a set of any suitable bearings 21, this bearing structure being designed to receive one end of the drive shaft 22 which is adapted to be connected with the engine or motor operating as the source of the power to be carried through the transmission. The drive shaft 22 is suitably splined, as indicated at 22', for engagement with certain gears, bushing and high speed drum, as will hereinafter appear. The other end of the shaft terminates in a reduced portion 24 received in a bushing sleeve 25 mounted in a recess 26 formed in the driven shaft 27, which in turn is journaled within suitable bearings 28 mounted centrally within the housing section 16 and adjustably secured in place by the clamping ring 29, as represented in Figure 3.

Adjacent to the bearing sleeve 20, a drive pinion 30 is secured to one end portion of the drive shaft 22, this gear being in constant mesh with a pair of gears 32 each of which is formed integral with a smaller gear 33, each pair of gears 32, 33, being journaled upon a stub shaft 34 and these two stub shafts 34 being carried at opposite sides of the shaft 22 by a clutch drum member 35 which is freely journaled upon the hub portion of the drive gear or pinion 30.

The gears 33 are in constant mesh with opposite sides of a gear 36 which is journaled on a bearing sleeve 37 carried by the shaft 22 and operating as a spacing sleeve between the gear 30 and another drive gear 38 secured to the intermediate portion of said shaft 22 (see Figures 3 and 4). At the rear of the gear 38 is another spacing sleeve 40, against the rear end of which is abutted a clutch drum member 41 which is secured to the shaft 22 between the sleeve 40 and the front end of the shaft 27.

Keyed to the hub portions of the gear 36 and of a clutch drum member 43 which is journaled upon the spacing sleeve 40, is a bearing frame or yoke 44, fitted with stub shafts 42 at opposite sides of the shaft 22, for journaling the low speed drive gears 45. The latter are in constant mesh with the drive gear 38, and formed integral with said gears 45 are the smaller gears 46 which are in constant mesh with a pair of reversing gears 47 (see Figure 4) journaled on stub shafts 48 also carried by the bearing yoke or frame 44. The gears 47 are also in constant mesh with the gear teeth 50 formed internally on the combination gear and clutch member 52 which is freely journaled upon the bearing yoke or frame 44, as shown in Figure 3.

The gears 45 are also in constant mesh with the gear teeth 54 formed internally on a combination gear and clutch drum member 55, which likewise is freely journaled upon that portion of the bearing frame yoke 44 which is supported by the hub of the drum member 43, as shown in Figures 3 and 4. The clutch drum 35 and both of the combination gear and clutch members 52 and 55 are formed with external clutch teeth for the purpose of engagement with the internal teeth of a set of clutch rings 58, 59, 60, respectively, surrounding said members 35, 52 and 55. The rings 58, 59 and 60 are designed to be engaged by a set of clutch clamping rings 61, 62, and 63, respectively, which are operated as hereinafter described for bringing the clutch ring 58 into clutched engagement with a clutch face 64 formed as a part of the interior face of the housing section 15 (Figure 1), and for clamping the clutch rings 59 and 60 in clutching engagement with a pair of fixed clutch rings 65 and 66 respectively. These fixed clutch rings 65 and 66 are mounted in fixed and spaced relation within the housing section 15 and between the clutch face 64 and a clutch assembly ring 68, the rings being spaced apart by means of spacing sleeves 69 and secured in this relation by means of tie bolts 70. The clutch rings 61, 62 and 63 are formed with guide lugs 61', 62' and 63', respectively, which slidingly engage the sleeves 69 in the operating movements of the clutch mechanism.

The clutch clamping rings 61, 62 and 63 are also formed with suitable lugs for the attachment of clutch actuating pins or rods 72 long enough to extend forward through the ring 68 with which said pins or rods 72 are slidingly engaged, at the front of which clamping ring 68 these pins or rods are fitted with terminal and adjustable (see Figure 10) contact nuts 74 all having their convex end faces 74' presented substantially in a common plane at the rear of the assembly ring 68. (See Figure 8.) There are three of these clutch actuating pins or rods 72 and contact nuts 74 for each of the movable clutch rings, the nuts 74 being designed to be engaged and actuated by a selector disk 75, the central portion of which is mounted for oscillating as well as sliding movement upon the central bearing portion 16' of the housing section 16, said disk 75 being formed with a set of three lugs 76 having the concave recesses 77 (see Figure 7) for operative contact with the end faces 74' of the several nuts 74.

The clutch actuating selector disk 75 is also provided with a set of three contact screws 78 designed for engagement with suitable recessed lugs 80 formed on the rear face of a bearing cup disk 82, the hub portion of which is slidingly keyed, as indicated at 83, upon the central bearing portion 16' of the housing section 16. The cup portion of the disk 82 houses a set of suitable bearings 84 surrounding the shaft 27 between the disk 82 and a spring buffer plate 85, against the front face of which is seated a coil spring 86, adapted to provide clearance for a high speed clutch hereinafter identified, said spring being compressed by the plate 85 against the central portion of a disk 87 formed integral with the forward end of the shaft 27 and rigidly secured to the periphery of the drum 43 by screws or bolts 49. The disk 85 is provided with a set of clutch actuating pins 88 operating slidingly through the disk 87, and attached to a clutch ring 89 in front of the latter. By reference to Figure 3 it will be seen that these parts and the clutch drum 43 are adapted to be operatively connected, through a set of multiple disk elements 90, with the clutch teeth 43' formed on the periphery of the clutch drum 41, whereby a direct drive relation is obviously established between the shafts 22 and 27.

The selector disk 75 is adapted to be maintained normally in a forward or clutch-closing position by the action of a yoke member 95 surrounding the bearing portion 16' of the bearing housing 16 and carried by an oscillating shaft 96 suitably mounted in bearings 94 in the housing section 16. One of the ends of the shaft 96 is fitted with an arm 97 the free end of which is pivotally connected with a link member 98, which in turn is pivotally connected at 99 with an operating lever 100 fulcrumed at 101 to the housing section 15, and adapted to be operated in any desired manner, manually or otherwise. The link member 98 is also pivotally connected at 102 to one end of a rod 103 slidingly engaged with a lug 104 projecting laterally from the housing 15, between which lug and an adjustable nut 105 on the free end of the rod 103 a coil compression spring 106 is carried by said rod, the action of said spring being conveniently varied by adjustment of said nut 105. The entire clutching operation of the clutch parts above described is thus accomplished by the action of this spring, when released by the lever 100, it being understood that the strength of this spring 106 exceeds that of the coil spring 86 between the disks 85 and 87, as spring 86 is only intended to move plate 85 back from disk 87 giving clearance to a high speed clutch hereinafter identified when operating at low or reverse speeds.

The central or hub portion of the selector disk 75 is provided with gear teeth 110 in mesh with a gear wheel 112 on a shaft 114 designed to be operated in any suitable manner and from any point, such as the steering wheel of the car. It is to be understood however that the gear teeth 110 of the selector disk 75 may be operated directly by a rack bar if desired instead of through the intermediary of gear 112. When so operated, the selector disk is adapted to be latched in any set position by means of a star wheel 115 engaged by a latching plunger 116 operating in a housing 117 formed on the interior of the casing section 16, and enclosing a coil compression spring 118 which serves to maintain the plunger 116 in constant engagement with the star wheel 115, the action of said spring being suitably varied by means of an adjusting nut 119 (see Figure 6).

The drawings illustrate the parts of the clutching mechanism as in what is known as neutral position, or with no drive action being transmitted from the shaft 22 to the shaft 27. The lugs 76 of the disk 75 are out of engagement with all of the contact nuts 74, and the contact screws 78 are likewise out of engagement with the lugs 80 of the disk 82. In shifting from neutral position to what is called low speed position of the selector disk, the lever 100 is operated to rock the shaft 96 and thereby relieve the selector disk from the action of the spring 106, and the selector control mechanism, including the shaft 114, is simultaneously operated to position said disk with the lugs 76 thereof opposite to the contact nuts 74 corresponding to the movable clutch ring 63; now, on releasing the lever 100 and allowing the spring 106 to act, this produces a forward movement of the selector disk 75 into engagement with the contact nuts 74 corresponding to the rings 63, thereby clamping the clutch ring 60 immovably against the fixed clutch element 66. This clutching action therefore renders the combined clutch and gear drum 55 immovable, the driving action from the gear 38 produces a counterclockwise rotation of the gears 45, and accordingly a clockwise movement of the bearing frame or yoke 44, carrying said gears, about the axis of the drive shaft; and since all the other parts of the transmission are unclutched and free to move idly, the result is a low speed drive action through the gears 38 and 45, the bearing yoke 44, clutch member 43, disk 87, to the shaft 27. In this action, the spring 86 maintains the clutch elements 90 inoperative due to the contact screws 78 being out of engagement with the disk 82.

In making the change from low speed to second or intermediate speed transmission, the lever 100 is again operated to relieve the clutch mechanism from the pressure of the spring 106, and the control mechanism simultaneously operated through the shaft 114 to move the selector disk 75 in position to present the lugs 76 opposite those contact nuts 74 corresponding to the movable clutch clamping ring 61, whereupon, on release of the lever 100, the forward movement of the disk 75 actuates the clamping ring 61 into clamping engagement with the clutch ring 58, with the result that this is held in immovable engagement with the clutch face 64. The clutch drum member 35 is now held against rotation, so that rotation of the driving gear 30 effects corresponding rotation of the gears 32 and 33 in a counterclockwise direction, and these impart clockwise movement to the gear 36, and through this to the bearing bracket frame 44, clutch drum member 43, disk 87, and the shaft 27, the remaining parts operating idly on account of the unclutched condition of the clutch mechanism corresponding thereto.

On shifting from second or intermediate speed transmission, to high speed or direct drive transmission, the lever 100 is operated as before, and the selector disk 75 also operated to present the screws 78 opposite to the lugs 80 of the disk 82 for actuation of the latter, on release of the lever 100, to carry the disk 85 forward against the action of the spring 86, for actuating the clutch elements 90 into engagement; in this position of the disk 75, its lugs 76 are presented out of register with any of the contact nuts 74 of the other clutch devices, so that the gear elements corresponding to these other clutch devices are free to move idly, while the drive is now transmitted direct through the clutch member 41, the clutch devices 90, clutch drum 43 and disk 87 to the shaft 27, this being in effect a direct drive from the shaft 22 to the shaft 27.

On shifting now from any of the above described positions to reverse driving transmission, the lever 100 is operated as before, and the selector disk 75 rotated by means of the shaft 114 to position the lugs 76 of the disk opposite to those contact nuts 74 corresponding to the movable clutch clamping ring 62, which actuates the clutch ring 59 into immovable clamping engagement with the clamping ring 65, thereby holding the combination gear and clutch drum 52 fixed against any rotative movement. The drive action now takes place through the gear 38, producing counterclockwise rotation of the gears 45 and 46 and hence opposite rotation of the reversing gear 47 which engages the internal gear teeth on the clutch drum 52. Therefore, this drum 52 being fixed and the gears 47 being carried by the bearing frame or yoke 44, the result is a movement of said frame or yoke in a counterclockwise direction, thereby imparting to the clutch drum member 43, disk 87, and shaft 27 a movement in the same counterclockwise direction.

It is an important feature of my change speed mechanism that the countershafts, on which are mounted the gears for the second speed, low gears and reverse drive are in each case double and on opposite sides of the main shaft, or 180 degrees apart. By this arrangement the central shaft and all bearings and bushings upon it are relieved of all side stress and the wear and friction due to side stress, and are subjected only to a torsional stress. Further, the stresses on the gear teeth and the counter shafts and their bearings are reduced to half that to which they would be subjected if only a simple counter shaft were used with the same diameter of gearing. This enables all the gears to be made of much smaller diameter than would otherwise be necessary, and reduce the size of the transmission necessary for an engine of a given power.

In speed changing mechanism for motor vehicles, it is particularly desirable that the efficiency should be high when the second speed gear is used, as that speed is used to a much greater extent than the low gear and reverse speed.

In the mechanism here shown and described, when the second speed clutch is closed, the power is transmitted through the speed gears 30, 32, 33 and 36 from the driving shaft 22 to the driven shaft 27. All the bearings of the parts which rotate on the central shaft, viz, the gears 36, the frame 44, clutch member 43 and disk 87, sustain only a torsional stress and exert no side stress on the central shaft to cause wear and friction. It is true that the gearing in mesh with the gear 38 is at this time in motion, as the gear 38 rotates at the same speed as the central shaft 22, but these gears and their attached moving parts are idling and transmitting no power. Thus, the only bearings which are under load when the second speed gears are in operation are the bearings on the counter shaft 34.

In Figures 11 and 12 is illustrated a modified form of construction using multiple disk clutch elements throughout, and the same type of planetary gearing for the low speed and reverse drive transmission, and the same type of direct drive transmission as in the form of construction already described, that is these figures illustrate internal gears for all speeds, while the construction shown in Figure 3 substitutes a regular gear reduction for the intermediate speed transmission. Referring in detail to the views shown in Figures 11 and 12, and using primed reference numerals to refer to parts corresponding in all essential details to analogous parts in the construction already described, the drive shaft 22' and driven shaft 27 are mounted in bearings 21' and 28' within the housings 15' and 16', which are secured together by screws 17'. The selector disk 75' is mounted and actuated the same as in the preceding construction for the purpose of selectively actuating the disk clutch elements 59' to the reverse drive gearing, a set of similar clutch elements 60' to the low speed drive gearing, and a set of clutch elements 58' corresponding to the second or intermediate speed drive transmission, the shiftable clutch rings 61, 62 and 63 being operated from the selector disk the same as in the previous construction. The low speed drive action is effected by closing the clutch elements 60' for rendering immovable the combined gear and clutch drum member 55', whereupon the driving gear 38' actuates the gears 45 and 46, and since the remaining clutch mechanisms are inoperative, the gearing corresponding thereto operates idly, and the bearing frame 44' is rotated in a clockwise direction, thereby imparting corresponding rotary movement to the clutch drum 43' which is rigidly connected to the disk 87' integral with the shaft 27.

On shifting to second or intermediate speed transmission, the clutch elements 58' are closed for rendering stationary the combination gear and clutch drum member 120 having the internal clutch teeth 121 in constant mesh with a gear or pinion 122 mounted on a stub shaft 123 carried by the combination gear and clutch drum member 43'. The gear 122 is in turn constantly meshed with a drive gear 124 fixed to the drive shaft 22'. By this means it is apparent that the gear and clutch drum member 43' is rotated at a reduced speed and in a clockwise direction for correspondingly rotating the shaft 27 through the medium of the disk portion 87'.

In changing to the reverse drive transmission, the clutch elements 59' are actuated into closed or engaged relation for rendering stationary the combination gear and clutch drum member 52', the internal teeth 50 of which are engaged by the reversing gear 47 which in turn meshes with the gear 46 as in the previous construction. Therefore, as the gear 38' is rotated by the shaft 22', the result is a counterclockwise rotation of the bearing frame member 44', and hence of the shaft 27' through the medium of the parts 43' and 87', as in the reverse drive operation already described. The manner of operating the clutch mechanism for effecting the direct drive action is the same in all essential particulars as in the previous construction, and needs no further explanation.

It will thus be seen that I have devised a very practical and highly efficient construction for carrying out all the desired objects of the invention, including the selective control, at will, of separate clutches for all the speed changes and the reverse drive action, in either of the forms of constructions described. By means of the illustrated construction, it is also to be observed that not only may the interior of the mechanism be inspected from time to time if desired by removal of the usual inspection or cover plates 130 and 132 of the housings 15 and 16, respectively, but upon the disconnection of these housing sections 15 and 16, by removal of the screws 17, all the interior parts may be removed as a unit, for replacement or inspection, and with a minimum amount of labor. This is designed to be operated in a bath of oil within the housing structure, the section 15 being provided with the usual drain plug 131. It is to be understood that for convenience the mechanism of the invention is illustrated as comprising three speeds forward and one reverse, but that by the substitution of proper clutches and train of gearing and increasing the length of the shafts in proportion any desired number of speeds forward or reverse may be readily provided. It is also to be understood that the invention is not to be restricted to the use of a single plate clutch as shown in Figure 3 or a multiple plate as shown in Figure 11, but that any suitable band, hydraulic or dog type of clutch may be substituted if found desirable. While I have illustrated and described what I now regard as the preferred forms of embodiment of the proposed improvements, I desire to expressly reserve the right to make all such changes or modifications which may fairly fall within the scope of the appended claims.

What I claim is:

1. Power transmitting mechanism comprising the combination of driving and driven shafts, a plurality of change speed and reversing gears occupying different transverse planes relative to said shafts and operably connecting the same, independently operable clutch devices associated with said gears and occupying substantially the same planes therewith, respectively, and clutch actuating means including contact elements terminating in a common plane and a member operable for selectively engaging said elements.

2. Power transmitting mechanism comprising the combination of driving and driven shafts, a pair of detachably connected housing sections mounted on said shafts, a combined clutch and change speed gear assembly mounted within one of said housing sections, and a selective clutch actuating means mounted within the other of said housing sections, said clutch and gear assembly being removable as a unit from its housing section upon disconnection and separation of said housing sections from each other.

3. Power transmitting mechanism comprising the combination of driving and driven shafts, a plurality of change speed and reversing gears operably connecting the shafts and including a combination internal gear and clutch member as a part of each train of said change speed and reversing gears, and separate and independently operable clutch means for holding the several combination gear and clutch members stationary including a selector member for selectively actuating said clutch means.

4. Power transmitting mechanism comprising the combination of driving and driven shafts, a plurality of change speed and reversing gears occupying different transverse planes relative to said shafts and operably connecting the same, and including a combination internal gear and clutch member as a part of and in substantially the same plane with each train of change speed and reversing gears, and separate and independently operable clutch means for holding the several combination gear and clutch members stationary, including a selector member for selectively actuating said clutch means.

5. Power transmitting mechanism comprising the combination of driving and driven shafts, a plurality of change speed and reversing gears occupying different transverse planes relative to said shafts and operably connecting the same, independently operable clutch devices associated with said gears and occupying substantially the same planes therewith, respectively, and clutch actuating rods terminating in contact elements adjustable to position their end faces in a common plane, and a selector member rotatable for selectively engaging said member with said contact elements.

6. Power transmitting mechanism comprising the combination of driving and driven shafts, separate trains of change speed gearing operably connecting said shafts and including a combination internal gear and clutch member forming a part of each of said trains of gearing, separate and independently operable clutch elements for severally holding said internal gear and clutch members stationary, and a selector member for selectively actuating said clutch elements.

7. Power transmitting mechanism comprising the combination of driving and driven shafts, separate trains of change speed and reversing gearing operably connecting said shafts and including a combination internal gear and clutch member forming a part of each of said trains of gearing, separate and independently operable clutch elements for severally holding said internal gear and clutch members stationary, and a selector member for selectively actuating said clutch elements.

8. In a power transmission, a change speed and reversing gear unit comprising planetary change speed and reversing gearing including combination internal gear and clutch drum members for each train of said gearing, clutching means for severally holding said gear and clutch drum members stationary, and means including a selector member for selectively actuating said clutching means.

9. In a power transmission, a change speed and reversing gear unit comprising planetary change speed and reversing gearing including combination internal gear and clutch drum members of substantially uniform diameter for each train of said gearing and occupying different transverse planes corresponding to said trains of gearing, clutch elements operative to hold said gear and clutch drum members stationary, spacing means for maintaining said clutch elements spaced in operative relation to the several drum members, and means including a selector member for selectively actuating said clutch elements.

In witness whereof I hereunto affix my signature.

EARL J. KEARBY.